Jan. 15, 1963   P. B. ANDERSEN   3,073,099
COMBINE CONTROL SYSTEM
Filed March 4, 1959   3 Sheets-Sheet 1

INVENTOR.
PETER BONDE ANDERSEN
BY
Wolfe, Hubbard, Voit & Osann
ATTORNEYS.

INVENTOR.
PETER BONDE ANDERSEN

Jan. 15, 1963    P. B. ANDERSEN    3,073,099
COMBINE CONTROL SYSTEM

Filed March 4, 1959    3 Sheets-Sheet 3

INVENTOR.
PETER BONDE ANDERSEN
BY
Wolfe, Hubbard, Voit & Osann
ATTORNEYS.

United States Patent Office 3,073,099
Patented Jan. 15, 1963

3,073,099
COMBINE CONTROL SYSTEM
Peter B. Andersen, Ayr, Ayrshire, Scotland, assignor to Massey-Ferguson (United Kingdom) Limited, Manchester, Lancashire, England, a British company
Filed Mar. 4, 1959, Ser. No. 797,090
8 Claims. (Cl. 56—20)

The present invention relates generally to mobile crop collecting and treating machines and concerns more particularly a control system for harvesting-threshing machines known as combines.

In a combine, the harvested crop is treated by a series of mechanisms conventionally including a threshing cylinder and cooperating concave, straw walkers, and a shaker shoe assembly together with an air-blast-producing fanning mill. The efficiency of these mechanisms is closely related to the amount of crop material which they are required to handle within a given time. In other words, a combine works most efficiently when the crop treating mechanisms are continuously supplied with a certain critical load of crop material. If too little material is supplied, the combine is not working up to capacity. If too much material is supplied, the crop treating mechanisms become overloaded and cannot function properly.

Normally, a combine operator controls the ground speed of his machine so that the rate of crop intake will, insofar as he can estimate, provide the optimum loading of the combine crop treating mechanisms. Estimation of the proper speed is very difficult since crop conditions vary widely, and no one average speed is "correct" for any particular crop. Furthermore, even with the same crop stand, crop density and other factors may vary, so that optimum efficiency cannot be achieved unless the ground speed of the combine is constantly and correctly varied to maintain a proper and uniform rate of crop intake.

Accordingly, it is an object of the invention to provide a combine control system effective to control the ground speed of a combine in accordance with the rate of crop intake so as to maintain a constant loading of the crop treating mechanisms of the combine.

It is a collateral object to provide a combine control system by which a desired loading of the combine crop treating mechanisms is selected by the combine operator and thereafter maintained, without further attention from the operator, despite widely varying crop conditions.

In more detail, it is an object to provide a control system as characterized above in which the desired rate of crop intake to be thereafter maintained is selected by the positioning of a simple manual control, such as a hand lever.

In one of its aspects, it is an object of the invention to provide a control system of the type referred to above which permits the selection of a maximum ground speed beyond which the combine will not accelerate. In this way, the control system cannot suddenly increase the ground speed of the combine to a dangerous level in an effort to maintain a desired rate of crop intake when the combine moves out of a crop stand and no crop is being harvested.

With more particularity, it is an object to provide a control system of the above type in which the positioning of a simple manual control, such as a hand lever, determines the maximum ground speed of the combine while it is in operation, and also provides ground speed control of the combine while it is being driven from job to job.

It is a further object to provide a control system as described above which is made up of simple, standard components so as to be economical to construct and reliable in operation.

Other objects and advantages of the invention will become apparent upon reading the following detailed description and upon reference to the drawings in which.

While the invention will be described in connection with certain preferred embodiments and procedures, it will be understood that I do not intend to limit the invention to those embodiments or procedures. On the contrary, I intend to cover all alternatives, modifications and equivalents as may be included within the spirit and scope of the invention as defined by the appended claims.

Figure 1:
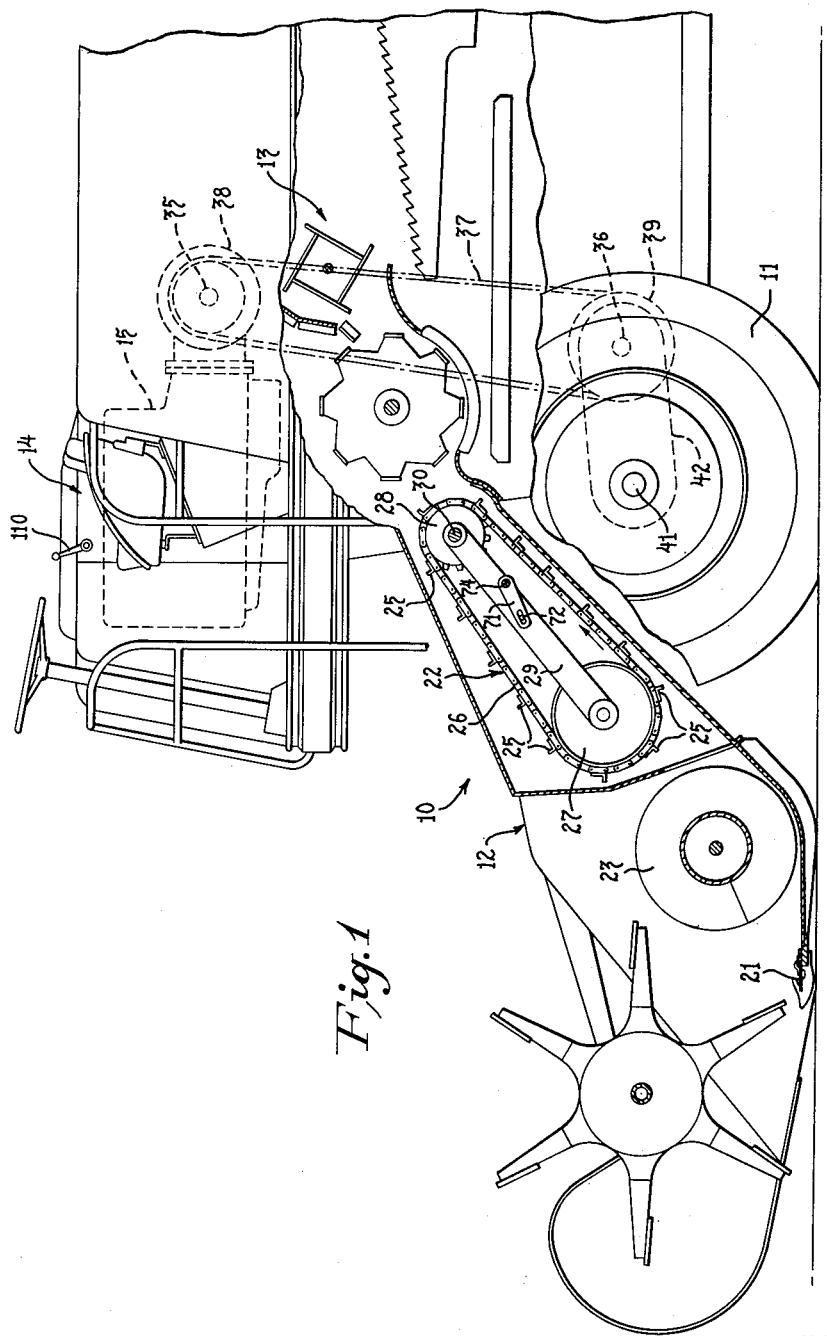
FIGURE 1 is a fragmentary elevation, partially in section, of a combine embodying the control system of the present invention.

Turning first to FIG. 1, there is shown the forward portion of a combine 10 in which the control system of the present invention is embodied. The combine is supported on ground engaging wheels of which only the forward driving wheels 11 are shown.

The illustrative combine includes a header assembly 12, crop treating mechanisms 13, an operator's station or platform 14, and an internal combustion engine 15 for powering the various driven elements of the combine. As is conventional in combines of this type, the header assembly 12 severs, gathers and delivers the crop material to the crop treating mechanisms 13 of the combine. For this purpose the header assembly includes a cutter bar 21 and an elevator mechanism 22. A transverse auger conveyor 23 receives severed crop material from the cutter bar 21 and transports it centrally of the header assembly where it is received by the elevator mechanism 22 and carried upwardly and rearwardly to the crop treating mechanisms 13 of the combine.

In the illustrated embodiment, the elevator mechanism 22 is an undershot, floating conveyor having a plurality of pusher elements 25 carried by flexible chains 26 that are trained about cylindrical members 27, 28. The cylindrical members 27, 28 are journaled at opposite ends of a frame 29, and the frame is pivoted about a shaft 30 which also serves as the axis for the cylindrical member 28.

When in operation, the elevator mechanism 22 is driven so that the chains run in the direction of the arrow in FIG. 1 and the entire assembly pivots about the shaft 30 so as to ride on the crop material being carried beneath the elevator to the crop treating mechanisms 13. Since the elevator is freely pivotable about the shaft 30, it accepts varying amounts of crop material. When large amounts of crop material are fed to the elevator mechanism by the auger conveyor 23, the mechanism rides up onto the material by swinging in a clockwise direction as seen in FIG. 1. When lesser amounts are received, the mechanism drops down toward its FIG. 1 position. The angular position of the elevator frame 29 thus indicates the amount of crop material being fed to the combine crop treating mechanisms.

For driving the combine over the ground, a driving train is provided between the engine 15 and the front driving wheels 11. The driving train includes an engine shaft 35 which, in the illustrated embodiment, extends transversely of the combine and is coupled to a drive shaft 36 by a belt 37 and a pair of pulleys 38, 39. The drive shaft 36 is geared through a transmission 42 to axles 41 which carry the driving wheels 11. Preferably, the transmission 42 provides selectable gear ratios so that the engine 15 may efficiently drive the combine 10 within selected speed ranges as will be clear to those skilled in the art.

Figure 2:
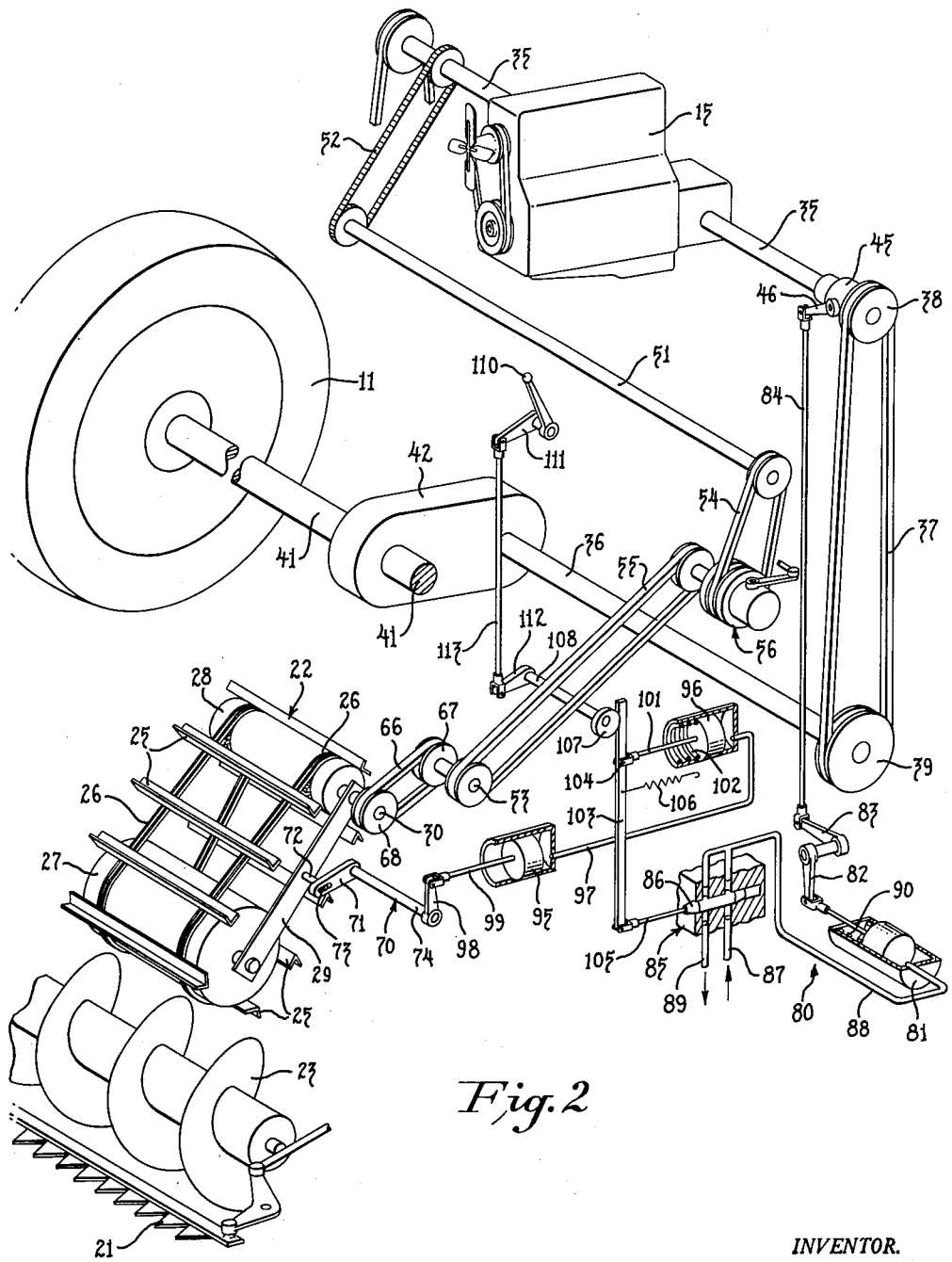
FIG. 2 is a perspective, diagrammatic assembly of the elements making up a control system in accordance with the invention.

In order to provide exact control of the combine ground speed, the driving train between the engine 15 and the ground wheels 11 includes a speed varying component in the form of a pulley whose diameter is infinitely variable. Pulleys of this type are well known standard components and in the illustrated preferred embodiment, the pulley 38 is of this type and includes an operating mechanism 45 having a control arm 46. In this particular unit, movement of the arm 46 in a counterclockwise direction as seen in FIG. 2 decreases the diameter of the pulley 38 and hence increases combine ground speed. Conversely, when the arm 46 is swung in a clockwise direction, the ground speed of the combine is reduced.

For powering the various elements of the combine which work upon the crop material being harvested, such as the cutter bar 21 and the elevator mechanism 22, a power shaft 51 is driven by a chain 52 from the transverse engine shaft 35. The drive shaft 51 is coupled to a header assembly shaft 53 through belts 54, 55 and a pulley assembly 56. To drive the elevator mechanism 22, a belt 66 is extended between a pulley 67 on the header assembly shaft 53 and a pulley 68 on the elevator shaft 30.

In accordance with the present invention, constant loading of the crop treating mechanisms 13 is maintained by sensing the amount of crop material being taken into the combine 10 and adjusting the ground speed of the combine to keep this amount at a selected, substantially constant level. When the amount of crop material being taken in becomes less, the combine is speeded up so that crop material is severed and fed into the combine at a higher rate. When the amount of crop material received by the combine increases beyond the selected amount, the combine is slowed down so that material is taken in at a lesser rate. The operator selects a desired loading at which the combine functions most efficiently, and this loading is maintained without further attention on the part of the operator even though crop conditions vary.

In order to sense the amount of crop material being taken in by the combine, one illustrated embodiment of the invention includes a sensing assembly 70 for directly measuring the volume of crop material flowing into the combine. The assembly 70 includes (see FIG. 2) a crank 71 coupled to the frame 29 of the floating elevator mechanism by means of a pin 72 which is secured to the frame 29 and which extends through a slot 73 formed in the end of the crank 71. It can thus be seen that when a large amount of crop material is received by the elevator mechanism 22 to be carried upwardly and rearwardly into the combine, the upward swinging movement of the elevator frame 29 causes the crank 71 to be raised and its crank shaft 74 to be rotated in a clockwise direction as seen in FIG. 2. When the amount of material flowing beneath the elevator mechanism 22 lessens, the frame 29 drops downwardly and the crank shaft 74 is rotated in a counterclockwise direction.

In order to vary the combine ground speed, an actuating device 80 is provided for setting the ground speed varying component, which is the variable diameter pulley 38. In the illustrated embodiment, the actuating device 80 includes a single action hydraulic motor 81 coupled by crank arms 82, 83 and a link 84 to the pulley control arm 46. The hydraulic motor 81 is operated by a valve 85 having a shiftable plunger 86 which, when moved to the left in FIG. 2, admits fluid from a pressure line 87 through a connecting line 88 to the motor 81. Movement of the valve plunger 86 to the right in FIG. 2 opens the line 88 to a fluid exhaust passage 89 so as to discharge fluid from the motor 81 and allow the motor piston to move toward the right under the urging of a compressed spring 90 that engages the piston. It can thus be seen that by selectively positioning the plunger 86 of the valve 85, the proper amount of hydraulic fluid can be supplied to the hydraulic motor 81 to rotate and hold the pulley control lever 46 in any desired position.

In carrying out the invention, the sensing assembly 70 and the actuating device 80 are coupled by an arrangement including a manually positionable control element which is effectively to permit selection of a particular rate of crop intake to be thereafter maintained. In this illustrated embodiment, the assembly 70 and the device 80 are coupled by a hydraulic linkage including a master cylinder 95 and a slave cylinder 96 coupled by a hydraulic line 97. Rotation of the sensing assembly crank shaft 74 in a clockwise direction drives the piston of the master cylinder 95, through an arm 98 and leg 99, to the right so as to propel hydraulic fluid through the line 97. This urges the piston in the slave cylinder 96, and its piston rod 101, to the left in FIG. 2 against the resistance of a compressed spring 102 which acts against the piston of the slave cylinder.

A control lever 103 is pivoted at 104 on the end of the slave cylinder piston rod 101 and is coupled through a link 105 to the plunger 86 of the valve 85. The lever 103 is urged in a counterclockwise direction about its pivot point 104 by a tensioned spring 106 so that its upper end abuts a cam 107. The cam 107 is carried on a shaft 108 which can be rotatably positioned by a hand control lever 110 coupled to the shaft 108 by a pair of arms 111, 112, and a link 113. It can thus be seen that when the operator swings the hand control lever 110 (see also FIG. 1), the cam 107 is rocked so as to swing the control lever 103 about its pivot point 104.

To explain the operation of the control system embodiment shown in FIG. 2, the interaction of the elements will be described when the control system is in operation. It will first be assumed that the combine 10 is in harvesting operation with the crop treating mechanisms 13 receiving a constant supply of crop material at a desired rate. As the combine moves along at a constant speed, a change in crop conditions causes, for the purpose of illustration, an increased supply of crop material to be received by the header assembly 12.

Upon receiving the increased amount of crop material, the elevator mechanism 22 is urged upwardly by the added material which it is called upon to handle. Lifting of the elevator frame 29 rotates the crank 71 is a clockwise direction and drives the piston of the master cylinder 95 toward the right, so that the piston rod 101 of the slave cylinder 96 is urged to the left against the resistance of the compressed spring 102. Movement of the piston rod 101 to the left swings the control lever 103 clockwise against the urging of the spring 106 about the fulcrum point defined by the cam 107. Clockwise movement of the control lever pulls on the link 105 and slides the valve plunger 86 to the left so as to admit hydraulic fluid to the hydraulic motor 81.

Admission of fluid to the motor 81 rocks the crank arms 82, 83 in a clockwise direction and lifts the link 84 so as to swing the pulley control lever 46 in a clockwise direction. As pointed out above, movement of the lever 46 in a clockwise direction increases the diameter of the pulley 38 and thus slows the ground speed of the combine. As the combine slows down, material is received by the header assembly 12 at a lesser rate so that the elevator frame 29 drops downwardly to its original position so as to swing the control lever 103 in a counterclockwise direction and thus restore the valve plunger 86 to its neutral position. The combine thus proceeds at its new ground speed until another change in the amount of crop material taken in by the combine causes the sensing assembly 70 to speed up or slow down the combine's ground speed.

It will now be understood how the combine ground speed is raised or lowered to maintain a constant amount of crop material flowing into the crop treating mechanisms of the combine so that these mechanisms operate under a constant loading. Next, attention will be directed to the manner in which positioning of the hand control lever 110 selects the rate of crop material intake which the control system will thereafter maintain. When the operator of the combine wishes to increase the crop material loading of the crop treating mechanism 13, he pulls back on the hand control lever 110, that is, the lever 110 is rocked in a clockwise direction as seen in FIG. 2. This lifts the link 113 and rotates the cam 107 clockwise so as to shift the fulcrum point for the control lever 103 to the left. At this point the slave cylinder piston rod 101 is stationary so that the control lever 103 pivots in a counterclockwise direction about its pivot point 104 under the urging of the spring 106 and thus the valve plunger 86 is urged to the right so as to exhaust fluid from the hydraulic motor 81. The motor spring 90 swings the arms 82, 83 in a counterclockwise direction and pulls down the link 84 so as to move the pulley control lever 46 counterclockwise. This decreases the diameter of the pulley 38 and thus increases the ground speed of the combine. The combine ground speed is increased until the increased amounts of crop material lift the elevator frame 29, thus rocking the crank 71 in a clockwise direction and urging the slave cylinder piston rod 101 to the left so as to swing the control lever 103 clockwise and restore the valve plunger 86 to its neutral position. It will be understood that the combine thereafter continues to operate at the higher rate of crop intake required to keep the valve plunger 86 in its neutral position and the speed of the combine is adjusted in the manner previously described so as to maintain the higher loading selected by positioning the hand control lever 110.

It will be noted that under a no-load condition, that is, when the combine moves out of a crop stand so that no material is received by the header assembly 12, the elevator mechanism frame 29 drops to its lowermost position and the slave cylinder piston rod 101 is urged, by the spring 102, as far to the right as is possible. This of course results in an immediate and continuing increase in the ground speed of the combine which is counteracted by the combine operator who manipulates the hand control lever 110 so that the control lever 103 is swung about the then fixed pivot point 104 until the valve plunger 86 returns to its neutral position.

Figure 3:
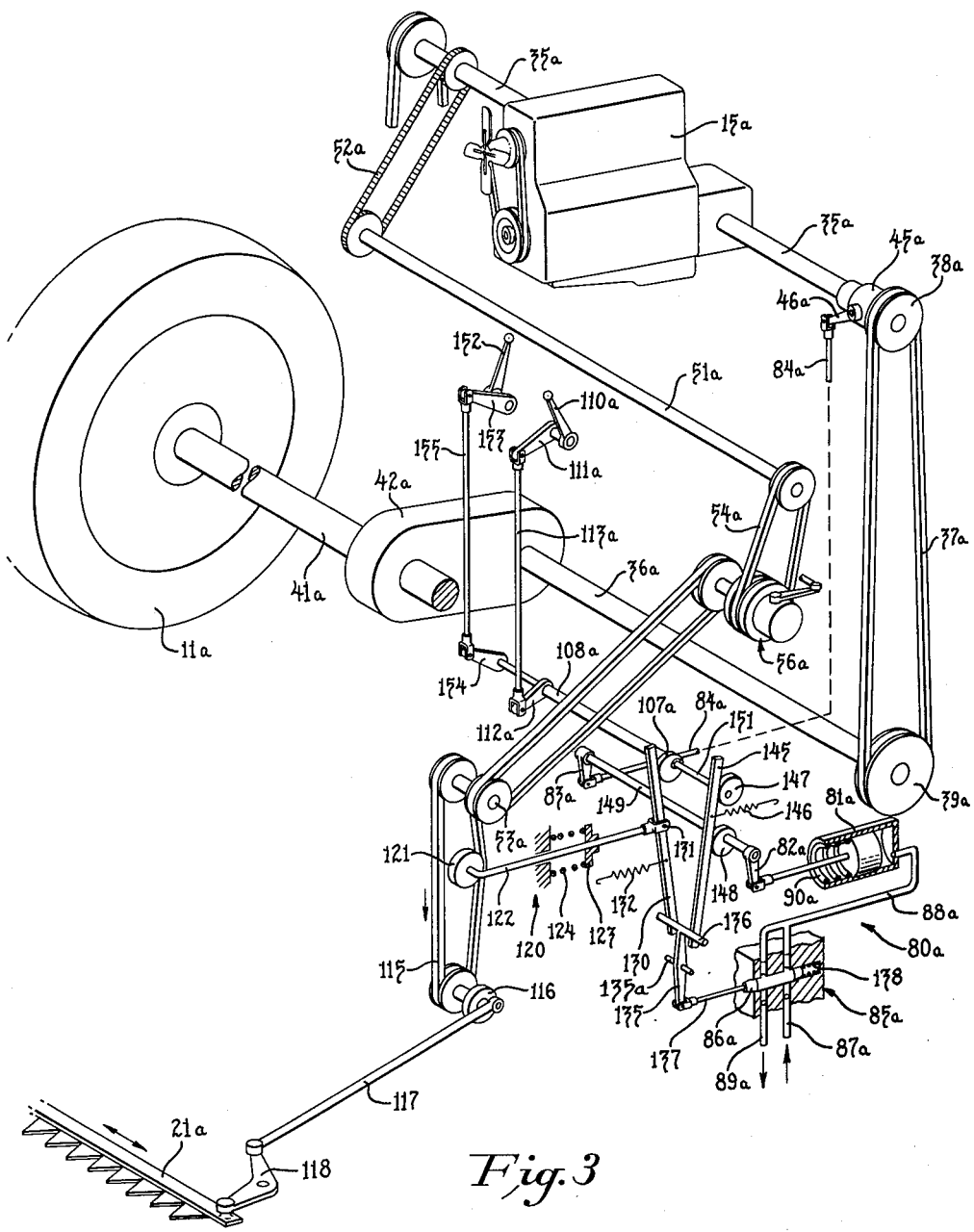
FIG. 3 is a perspective diagrammatic assembly of a modified control system also embodying the present invention.

Turning now to the modification of the invention shown in FIG. 3, it will be observed that those parts which correspond to the elements described above in connection with the FIG. 2 modification have been given the same identifying numeral with the distinguishing suffix *a* added. Thus, the control system of the modification shown in FIG. 3 includes an actuating device 80*a* including an hydraulic motor 81*a* coupled through crank arms 82*a* and 83*a* to a link 84*a* which is connected to a pulley control lever 46*a*. A valve assembly 85*a* controls the operation of the motor 81*a* and includes a valve plunger 86*a* which admits fluid from a supply line 87*a* to the motor through a connecting line 88*a*, or exhausts fluid from the motor by coupling the line 88*a* to an exhaust passage 89*a*.

In this modification, a sensing assembly 120 detects the amount of crop material being taken in by the combine by reacting to the amount of power utilized by one of the driven elements working on the harvested crop. In the illustrated embodiment, the driven element with which the sensing assembly cooperates is the cutter bar 21*a*. The cutter bar 21*a* is driven from a header assembly shaft 53*a* by a belt 115 which rotates a crank 116. The crank 116 oscillates the cutter bar 21*a* through a link 117 and a bell crank 118.

To accomplish its purpose, the sensing assembly 120 includes a roller 121 which is journaled on a slidable rod 122 and rides on the belt 115. The rod 122 carries a collar 123 against which a compressed spring 124 acts to urge the rod 122 to the right in FIG. 3. It can thus be seen that tension in the belt 115 tends to straighten the belt and pull the roller 121 to the left against the resistance of the spring 124. Since the tension of the belt 115 is dependent upon the power absorbed by the cutter bar 21*a*, it can be seen that the position of the rod 122 is directly dependent upon the amount of power being transmitted by the belt 115.

Carried on the end of the rod 122 is a control lever 130 which is pivoted to the rod 122 at 131 and which is urged about its pivot point by a tensioned spring 132. The spring 132 swings the control lever 130 about the pivot point 131 so that the upper end of the control lever comes into contact with a cam 107*a* which is carried on a rotatable sleeve 108*a*. The cam 107*a* can be rotatably positioned by manipulation of a hand control lever 110*a* that is coupled to the sleeve 108*a* by arms 111*a*, 112*a*, and a link 113*a*.

A one-way connection which takes the form of a rocking lever 135 pivoted at 135*a* and having a cross head 136 is provided between the lower end of the control lever 130 and the control valve plunger 86*a*. The rocking lever 135 is connected to the valve plunger 86*a* by a link 137, and a compressed spring 138 acts against the valve plunger and through the link 137 so as to urge the rocking lever 135 in a clockwise direction until the cross head 136 abuts the control lever 130.

To briefly explain the operation of this embodiment of the invention, it will be assumed that the control system has been adjusted to provide a certain desired loading of the crop treating mechanisms of the combine. As the combine moves into a heavier crop stand which would increase the loading of the crop treating mechanisms if the combine were not slowed down, the heavier crop stand provides more resistance to movement of the cutter bar 21*a* and added power is required to drive the cutter bar. The increase of power in the driving train to the cutter bar creates additional tension in the belt 115 so that the roller 121 and its supporting rod 122 is carried to the left in FIG. 3 against the resistance of the spring 124. Movement of the rod 122 to the left pulls the control lever 130 so that it swings in a clockwise direction under the urging of the spring 132 about the fulcrum defined by the cam 107*a* and rocks the rocking lever 135 in a counterclockwise direction. Rotation of the lever 135 in a counterclockwise direction shifts the valve plunger 86*a* to the right and exhausts fluid from the hydraulic motor 81*a*. This permits the spring 90*a* to pivot the levers 82*a*, 83*a* in a counterclockwise direction and lift the link 84*a* so as to swing the pulley control arm 46*a* clockwise. This movement of the arm 46*a* increases the diameter of the pulley 38*a* and decreases the ground speed of the combine. The ground speed continues to decrease until the power absorbed by the cutter bar 21*a* reaches its former level, whereupon the rod 122 is carried to the right by the spring 124 and the valve plunger 86*a* is restored to its neutral position.

Similarly to the FIG. 2 embodiment, selection of a particular loading which is to be thereafter maintained is accomplished by positioning the hand control lever 110*a*. In the FIG. 3 embodiment, pulling the lever 110*a* in a clockwise direction lifts the link 113*a* and rotates the sleeve 108*a* which carries the cam 107*a*. Rotation of this cam in a clockwise direction urges the control lever 130 in a counterclockwise direction about its pivot point 131 against the resistance of the spring 132. The valve spring 138 is thus able to shift the valve plunger 86*a* to the left as the cross arm 136 of the rocking lever 135 follows in engagement with the control lever 130. Shifting of the plunger 86*a* to the left admits fluid under pressure to the hydraulic motor 81*a* and, through the crank arms 82*a*, 83*a*, drops the link 84*a* and rotates the pulley control lever 46*a* in a counterclockwise direction. Movement of the lever 46*a* counterclockwise decreases the diameter of the pulley 38a and thus increases the ground speed of the combine so that crop material is taken in by the combine at a higher rate. The ground speed of the combine continues to increase until the higher rate of combine intake increases the loading on the cutter bar 21a to a point where the rod 122 shifts to the left and restores the valve plunger 86a to its neutral position.

In accordance with a further aspect of the invention, the control system of the FIG. 3 modification includes a positionable element effective to prevent operation of the system to produce a combine ground speed above a selected maximum limit without regard to the amount of crop material taken in by the combine. Movement of this positionable element controls the maximum speed to which the combine will accelerate when a no-load condition is encountered and thus permits the ground speed of the combine to be adjusted under no-load conditions.

In the illustrated and preferred embodiment, the positionable element referred to is formed as a swingable lever 145 urged by a tensioned spring 146 against a pair of cams 147 and 148. The cam 148 is fixed on a rotatable shaft 149 which fixedly carries the crank arms 82a, 83a. The cam 147 is mounted on a rotatable shaft 151 which is rotatably positioned by a speed control lever 152. Preferably, the shaft 151 passes through the sleeve 108a and is coupled to the speed control lever 152 by a pair of levers 153, 154 and a link 155.

To illustrate the operation of the speed control lever 152 and its related structure, a no-load condition will be assumed wherein a negligible amount of power is transmitted to the cutter bar 21a and thus the rod 122 is shifted under the urging of the spring 124 so as to rock the control lever 130 counterclockwise to the full extent of its travel. Under these conditions, movement of the speed control lever 152 clockwise, that is, when the operator pulls back on this lever, is effective to decrease combine speed. Conversely, movement of the lever 152 forwardly, that is, counterclockwise, is effective to increase combine speed. When combine speed is to be reduced, the lever 152 is swung in a clockwise direction so as to lift the link 155 and rotate the shaft 151, and thus the cam 147, in a clockwise direction. This causes the lever 145 to swing in a clockwise direction under the urging of the spring 146 about the fulcrum defined by the then stationary cam 148. As the lever 145 swings, its lower end strikes the cross head 136 of the rocking lever 135. Thus, clockwise movement of the lever 145 swings the lever 135 in a counterclockwise direction so as to shift the valve plunger 86a to the right and discharge fluid from the hydraulic motor 81a. This permits the valve spring 90a to swing the levers 82a and 83a in a counterclockwise direction so as to lift the link 84a and move the pulley control lever 46a in a clockwise direction. This increases the diameter of the pulley 38a and decreases the ground speed of the combine.

It will also be noted that rotation of the levers 82a 83a results in rotation of their shaft 149, so that the cam 148 is also rotated clockwise upon exhaustion of fluid from the motor 81a. Rotation of the cam 148 in a clockwise direction urges the lever 145 against the urging of the spring 146 in a clockwise direction about the fulcrum formed by the cam 147. Clockwise movement of the lever 145 swings the rocking lever 135 counterclockwise and restores the valve plunger 86a to its neutral position. It may thus be observed that for every position of the speed control lever 152, there is a corresponding position of the pulley control arm 46a which, through the cams 147 and 148, respectively, is effective to hold the lever 145 at the proper angle to keep the valve plunger 86a in its neutral position. In this way, combine speed is governed by the setting of the lever 152.

When the combine is driven into a field and moved into operation, the operator pushes forward the speed control lever 152 to select a desired maximum speed beyond which the combine will not accelerate. The combine is moved into the crop and the hand control lever 110a is adjusted to establish the desired rate of crop material intake which is thereafter maintained in the manner previously described. If the rate of crop intake falls off sharply so that the rod 122 shifts far to the right and the control lever 130 swings in a substantial counterclockwise arc, the rocking lever 135, under the urging of the spring 138 follows the control lever 130 only until the cross head 136 strikes the lever 145. In this way, the speed of the combine is not permitted to exceed that which is established by the positioning of the lever 145 under the control of the speed control lever 152.

It will also be observed that the interaction of the cams 147, 148 on the lever 145 makes it unnecessary for the operator to "hunt" with his controls for the proper setting at which the valve plunger 86a will be disposed in its neutral position. Thus, in a combine controlled by the embodiment of the invention shown in FIG. 3, the speed of the combine is always under the control of the operator through the lever 152, and the control system never "runs away" under varying load conditions or requires the operator to "hunt" for the control setting in which the actuating device 80a is in neutral, non-operating condition.

I claim as my invention:

1. In a combine having ground wheels, a ground speed control system comprising, in combination, a driving train for supplying power to the ground wheels of the combine, said driving train having a speed varying component settable to provide a range of ground speeds for the combine, an actuating device for setting said component, means on said combine for bringing crop material into said combine, said means having a yieldable element operatively associated therewith, sensing means operatively associated with said yieldable element and positioned by said element, said sensing means being responsive to the rate at which crop material is brought into the combine, and means coupling said actuating device and said sensing means so as to increase combine ground speed when the amount of crop material brought in drops below a selected rate and to decrease ground speed when the amount raises above said rate.

2. In a combine having ground wheels, a ground speed control system comprising, in combination, a driving train for supplying power to the ground wheels of the combine, said driving train having a speed varying component settable to provide a range of ground speeds for the combine, an actuating device for setting said component, means on said combine for bringing crop material into said combine, said means having a yieldable element operatively associated therewith to be directly positioned by the volume of the flow of crop material brought into the combine, sensing means operatively associated with said yieldable element and positioned by said element, said sensing means being responsive to the volume of the flow of crop material being brought into the combine, and means coupling said actuating device and said sensing means so as to increase combine ground speed when the amount of crop material brought in drops below a selected rate and to decrease ground speed when the amount raises above said rate.

3. In a combine having ground wheels, a ground speed control system comprising, in combination, a driving train for supplying power to the ground wheels of the combine, said driving train having a speed varying component settable to provide a range of ground speeds for the combine, an actuating device for setting said component, means on said combine for bringing crop material into said combine, said means having a yieldable element operatively associated therewith, sensing means operatively associated with said yieldable element and positioned by said element, said sensing means being responsive to the rate at which crop material is brought into the combine, and means coupling said actuating device and said sensing means so as to increase combine ground speed when the amount of crop material brought in drops below a selected rate and to decrease ground speed when the amount raises above said rate, said last named means including a manually positionable control element effective to vary said selected rate within upper and lower limits.

4. In a combine, a control system for maintaining a constant loading of the combine crop treating mechanisms comprising, in combination, a positionable control effective to vary the ground speed of the combine, an actuating device for selecting the position of said control, means on said combine for bringing crop material into said combine, said means having a yieldable element operatively associated therewith, sensing means operatively associated with said yieldable element and positioned by said element, said sensing means being responsive to the rate at which crop material is brought into the combine, and means coupling said sensing means and said actuating device so that the ground speed of the combine is varied to keep said amount of material at a substantially constant level.

5. In a combine having a crop elevator with a floating conveyor for bringing crop material into said combine, a control system for maintaining a constant loading of the combine crop treating mechanisms comprising, in combination, a positionable control effective to vary the ground speed of the combine, an actuating device for selecting the position of said control, sensing means coupled to said floating conveyor and positioned by the latter, said sensing means being responsive to the rate at which crop material is brought into the combine by sensing the position of said conveyor, and means coupling said sensing means and said actuating device so that the ground speed of the combine is varied to keep said amount of material at a substantially constant level.

6. In a combine having means for bringing crop material into said combine, said means including a cutter bar having a yieldable element operatively associated therewith, a control system for maintaining a constant loading of the combine crop treating mechanisms comprising, in combination, a positionable control effective to vary the ground speed of the combine, an actuating device for selecting the position of said control sensing means operatively associated with said yieldable element and positioned by said element, said sensing means being responsive to the rate at which crop material is brought into the combine by sensing the power in said drive, and means coupling said sensing means and said actuating device so that the ground speed of the combine is varied to keep said amount of material at a substantially constant level.

7. In a combine having means for bringing crop material into said combine, said means having a yieldable element operatively associated therewith, a ground speed control system comprising, in combination, a driving train supplying power to the ground wheels of the combine, said driving train having a speed varying component settable to provide a range of ground speeds for the combine, an actuating device for setting said component, sensing means operatively associated with said yieldable element and positioned by said element, said sensing means being responsive to the rate at which crop material is brought into the combine, and means coupling said actuating device and said sensing means so as to increase combine ground speed when the amount of crop material brought in drops below a selected rate and to decrease ground speed when the amount rises above said rate, said last named means including a control element effective to prevent operation of said device in a manner to produce a ground speed above a maximum limit without regard to the amount of material brought into the combine, said control element being positionable so as to vary said maximum limit and thus control the ground speed of the combine when crop material is not being brought into the combine.

8. In a combine, a control system for maintaining a constant loading of the driven combine crop treating mechanisms comprising, in combination, a positionable control effective to vary the drive speed of said mechanisms with respect to the ground speed of the combine, an actuating device for selecting the position of said control, means in said combine for bringing crop material into said combine, said means having a yieldable element operatively associated therewith, sensing means operatively associated with said yieldable element and positioned by said element, said sensing means being responsive to the rate at which crop material is taken into the combine, and means coupling said sensing means and said actuating device so that the relative speeds of said mechanisms and said combine are varied to keep said amount of material at a substantially constant level.

References Cited in the file of this patent

UNITED STATES PATENTS

| | | |
|---|---|---|
| 2,369,745 | Millard et al. | Feb. 20, 1945 |
| 2,611,227 | Keller | Sept. 23, 1952 |
| 2,639,569 | Pasturczak | May 26, 1953 |
| 2,763,114 | Carruthers | Sept. 18, 1956 |
| 2,770,937 | Huddle | Nov. 20, 1956 |
| 2,842,925 | Allen | July 25, 1958 |
| 2,867,958 | Allen | Jan. 13, 1959 |